United States Patent
Panchamgam et al.

(10) Patent No.: US 11,501,763 B2
(45) Date of Patent: Nov. 15, 2022

(54) MACHINE LEARNING TOOL FOR NAVIGATING A DIALOGUE FLOW

(71) Applicant: Oracle International Corporation, Redwood Shores, CA (US)

(72) Inventors: Kiran V. Panchamgam, Burlington, MA (US); Sandhya Lonial, Burlington, MA (US); Sajith Vijayan, Burlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 236 days.

(21) Appl. No.: 16/387,834

(22) Filed: Apr. 18, 2019

(65) Prior Publication Data

US 2020/0126540 A1 Apr. 23, 2020

Related U.S. Application Data

(60) Provisional application No. 62/748,929, filed on Oct. 22, 2018.

(51) Int. Cl.
*G10L 15/18* (2013.01)
*G10L 15/22* (2006.01)
(Continued)

(52) U.S. Cl.
CPC ........ *G10L 15/18* (2013.01); *G06F 16/90332* (2019.01); *G06N 20/00* (2019.01); *G10L 15/22* (2013.01); *G10L 15/26* (2013.01)

(58) Field of Classification Search
CPC ......... G10L 15/18; G10L 15/22; G10L 15/26; G06F 16/90332; G06N 20/00
See application file for complete search history.

(56) References Cited

U.S. PATENT DOCUMENTS 6,370,532 B1 * 4/2002 Gebauer ............... G06F 16/972
10,013,416 B1 * 7/2018 Bhardwaj ............... G06F 40/30
(Continued)

FOREIGN PATENT DOCUMENTS

WO 2016040769 A1 3/2016

OTHER PUBLICATIONS

Gupta et al., "An E-Commerce Website based Chatbot", International Journal of Computer Science and Information Technologies, vol. 6 (2), 2015, pp. 1483-1485.
(Continued)

*Primary Examiner* — Fariba Sirjani
(74) *Attorney, Agent, or Firm* — Potomac Law Group, PLLC

(57) ABSTRACT

Embodiments provide systems and methods for navigating a dialogue flow using a trained intelligence bot. Upon initiation of a chat session between a user and a trained intelligence bot, one or more utterances can be received. The utterances can be processed using the trained intelligence bot to resolve an intent from among a plurality of predefined intents, where the intelligence bot is trained to resolve predefined intents based on training data associated with the predefined intents. A predefined dialogue flow associated with the resolved intent can be navigated using the intelligence bot, where the intelligence bot guides the user through the dialogue flow using context variables that are associated with the user or the chat session. The user can be provided enterprise data retrieved by the intelligence bot using a retrieval request generated based on one or more of the navigation of the dialogue flow or the context variables.

19 Claims, 11 Drawing Sheets

(51) Int. Cl.
*G06N 20/00* (2019.01)
*G06F 16/9032* (2019.01)
*G10L 15/26* (2006.01)

(56) References Cited

U.S. PATENT DOCUMENTS

| | | | |
|---|---|---|---|
| 10,678,406 B1* | 6/2020 | Banfi | G06F 9/453 |
| 2002/0083413 A1* | 6/2002 | Kodosky | G06F 8/34 |
| | | | 717/109 |
| 2005/0028085 A1* | 2/2005 | Irwin | H04M 3/4938 |
| | | | 715/234 |
| 2005/0055321 A1* | 3/2005 | Fratkina | G06N 5/042 |
| | | | 706/50 |
| 2006/0212841 A1* | 9/2006 | Sinai | G06F 8/38 |
| | | | 717/105 |
| 2008/0184164 A1* | 7/2008 | Di Fabbrizio | G06F 3/167 |
| | | | 715/809 |
| 2008/0304650 A1* | 12/2008 | Catlin | H04M 3/24 |
| | | | 379/298 |
| 2014/0068618 A1* | 3/2014 | Lin | G06F 9/453 |
| | | | 718/101 |
| 2015/0039316 A1* | 2/2015 | Tzirkel-Hancock | |
| | | | G10L 15/1815 |
| | | | 704/275 |
| 2016/0163314 A1* | 6/2016 | Fujii | G10L 13/027 |
| | | | 704/275 |
| 2018/0131642 A1* | 5/2018 | Trufinescu | G10L 15/30 |
| 2019/0205461 A1* | 7/2019 | Rodgers | G06F 3/167 |
| 2019/0213999 A1* | 7/2019 | Grupen | H04M 3/4936 |
| 2020/0004874 A1* | 1/2020 | Gupta | G10L 15/22 |

OTHER PUBLICATIONS

Meskill, "Oracle Retail Advanced Science Engine Cloud Services Implementation Guide Release 15.0", E72340-01, Mar. 2016, 116 pages.

* cited by examiner

Submitted 12
0.01%
18%
16.8...
82%

Reviewed 3
40%
5.04K
0.20%
60%

Ready for review 8
0.03%
85.7...
98%

Actions▼ View▼  Summer

| Run ID | Run Name | Modified by | Season | Depa |
|---|---|---|---|---|
| 1929 | Summer 2017 o... | OOSuperUser | 2017 Summer | Wom |
| 1928 | Summer 2017 o... | OOSuperUser | 2017 Summer | Wom |
| 1922 | Summer 2017 o... | OOSuperUser | 2017 Summer | Wom |

Columns Hidden 5

602

How can I help you with Offer Optimization Application?

Show locations that do not meet approval criteria

Okay, seems like you are interested in finding exceptions. First, which department are you interested in?

Womens Activewear

What metric type you are looking for?

Margin Improvement

Revenue Improvement

Sellthrough Improvement

Sellthrough

Type a message

FIG. 6C

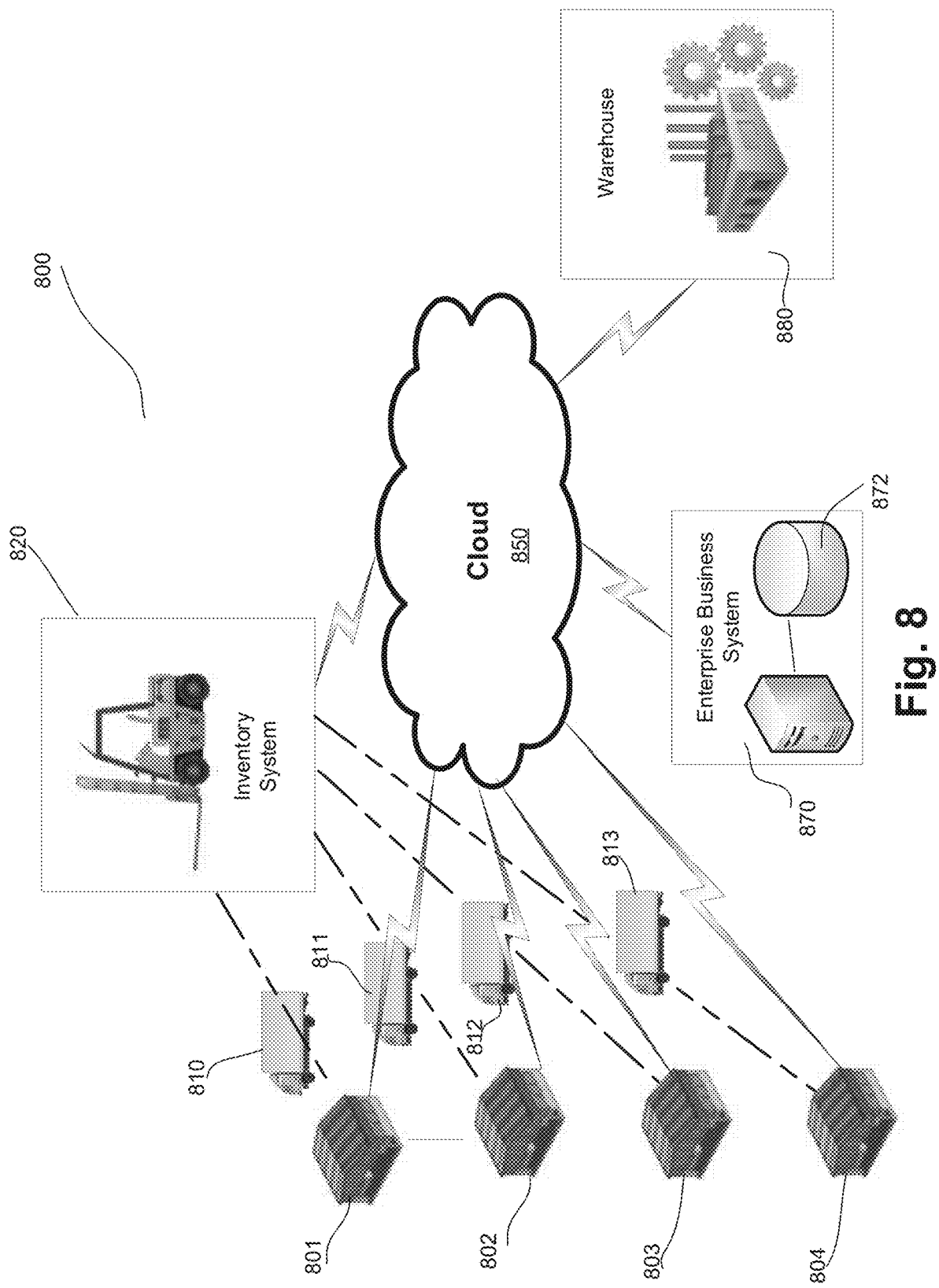

MACHINE LEARNING TOOL FOR NAVIGATING A DIALOGUE FLOW

CROSS REFERENCE TO RELATED APPLICATIONS

This application claims priority of U.S. Provisional Patent Application Ser. No. 62/748,929, filed on Oct. 22, 2018, the disclosure of which is hereby incorporated by reference.

FIELD

The embodiments of the present disclosure generally relate to a machine learning tool for navigating a dialogue flow.

BACKGROUND

Artificial Intelligence ("AI") implementations have generated tangible benefits, from supervised learning based predictions to facial recognition. However, challenges that surround AI remain, such as implementation specific issues that often vary across different systems. For example, human to machine interaction with an AI system still leaves much to be desired. In addition, it can be difficult to achieve an AI solution that generates a valuable result, such as a result that has specific value to an enterprise, client, or individual. Accordingly, an AI tool that can deliver expected, consistent, and valuable results would be beneficial to the user of such a system.

SUMMARY

The embodiments of the present disclosure are generally directed to systems and methods for navigating a dialogue flow using a trained intelligence bot that substantially improve upon the related art. Upon initiation of a chat session between a user and a trained intelligence bot, one or more utterances can be received from the user. The utterances can be processed using the trained intelligence bot to resolve an intent from among a plurality of predefined intents, where the intelligence bot is trained to resolve predefined intents from user utterances based on training data associated with each of the predefined intents. A predefined dialogue flow associated with the resolved intent can be navigated using the intelligence bot, where the intelligence bot guides the user through the dialogue flow using context variables that are associated with the user or the chat session. The user can be provided enterprise data retrieved by the intelligence bot using a retrieval request generated based on one or more of the navigation of the dialogue flow or the context variables.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIGS. 6A-6C illustrate an example dialogue flow according to an example embodiment.

FIG. 8 illustrates an integrated supplier, inventory, and logistics system that includes improved supply actions as disclosed herein according to an example embodiment.

DETAILED DESCRIPTION

Figure 1:
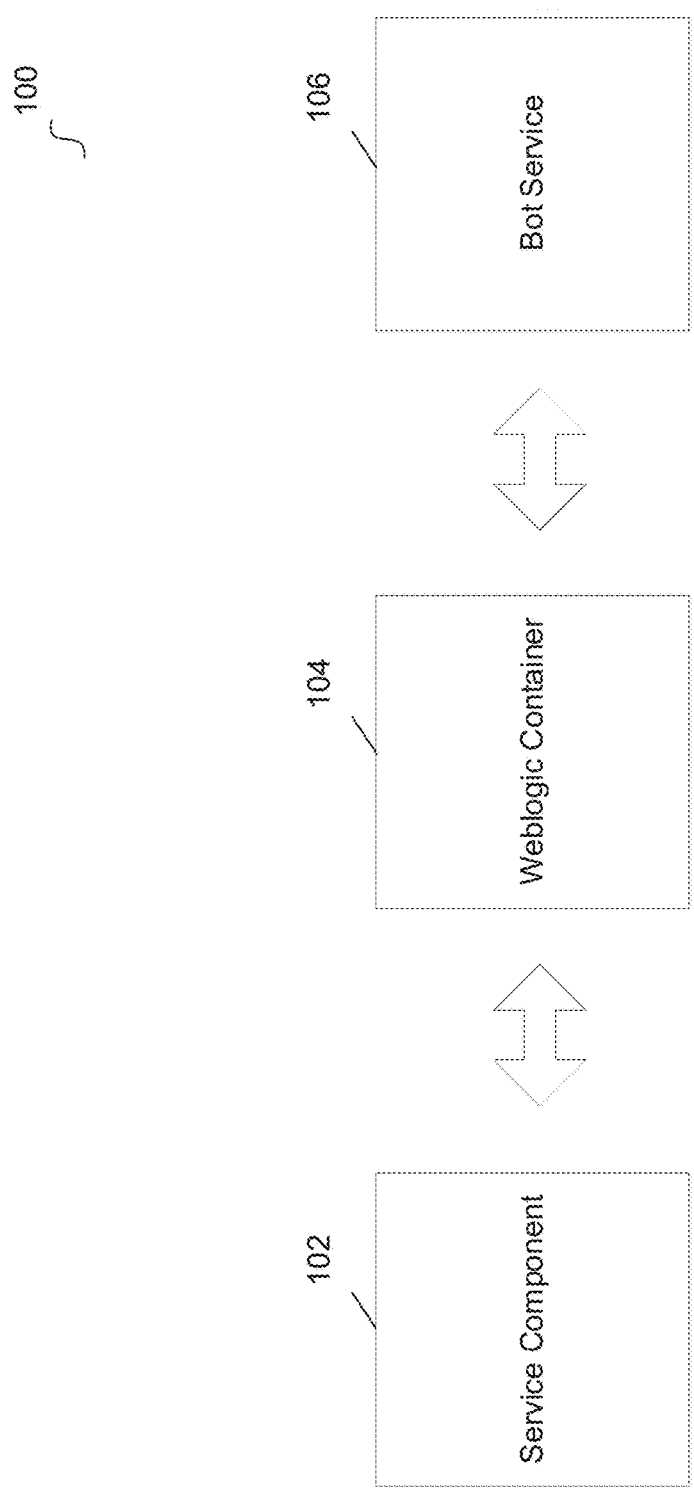
FIG. 1 illustrates a system for navigating a dialogue flow using a trained intelligence bot according to an example embodiment.

Embodiments navigate a dialogue flow using a trained intelligence bot. In some embodiments, a chat session can be initiated between a user and a trained AI component, such as a trained intelligence bot. For example, the user may be interfacing with a software application, such as an enterprise software application with a given configuration. The software application configuration can include the data that is displayed by the software application, a cross-section of data that the user is viewing, that is being analyzed, or that is otherwise selected, a user identification or role, and any other suitable configuration information. In some embodiments, such software application configuration information can be known as context.

The user may have an intent when chatting with the trained intelligence bot. For example, when using an enterprise application, the user may want to retrieve certain enterprise data, process or analyze certain data, run a batch software process or some other function, a combination of these, or any other suitable intent. In some embodiments, the intelligence bot can be trained to resolve an intent from among a plurality of intents based on the text input by the user, or the user utterances. For example, the intelligence bot can be trained with example text for each of the plurality of intents, and can thus leverage the examples to resolve an intent from the user utterances. The software application context, which can be passed to the intelligence bot, can also be used to resolve the intent.

In some embodiments, a predefined dialogue flow that is associated with the resolved intent can be navigated by the intelligence bot. For example, a dialogue flow associated with the intent can be defined, such as in a markup language data document (or other data description language document). In some embodiments, the data document can define variables, states, and transitions for the dialogue flow. The intelligence bot can exchange messages with the user based on the predefined dialogue flow. In some embodiments, the state transitions followed by the intelligence bot to navigate the dialogue flow are based on the responses the user provides to the intelligence bot's messages.

In some embodiments, the navigation of the dialogue flow can trigger the performance of a function. For example, a retrieval request (e.g., query) can be generated to retrieve enterprise data, where the parameters for the retrieval request are based on the responses provided by the user while navigating the dialogue flow and/or the software application context. In another example, a software process (e.g., batch process) can be triggered, such as a process that is adjusted based on user intervention/edits or that includes user approval, where the dialogue flow can involve the user intervention, edits, and/or approval that relate to the software process. In some embodiments, one or more of these functions can be included within the navigation of the dialogue flow.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for navigating a dialogue flow using a trained intelligence bot according to an example embodiment. System 100 includes service component 102, web logic container 104, and bot service 106. In some embodiments, service component 102 can provide a client that communicates with web logic container 104 and/or bot service 106 to navigate a dialogue flow. For example, a chat session can be initiated with a user via service component 102, and web logic container 104 and bot service 106 can provide functionality for the chat session.

In an embodiment, bot service 106 can provide a trained intelligence bot for the chat session. In an embodiment, web logic container 104 can host a chat server for the session and/or implement custom business logic components used to navigate the dialogue flow. Service component 102, web logic container 104, and bot service 106 can be used in combination to achieve a chat session with the user where a trained intelligence bot navigates a dialogue flow with the user. Any other suitable framework, component, or combination of components can similarly be implemented.

Figure 2:
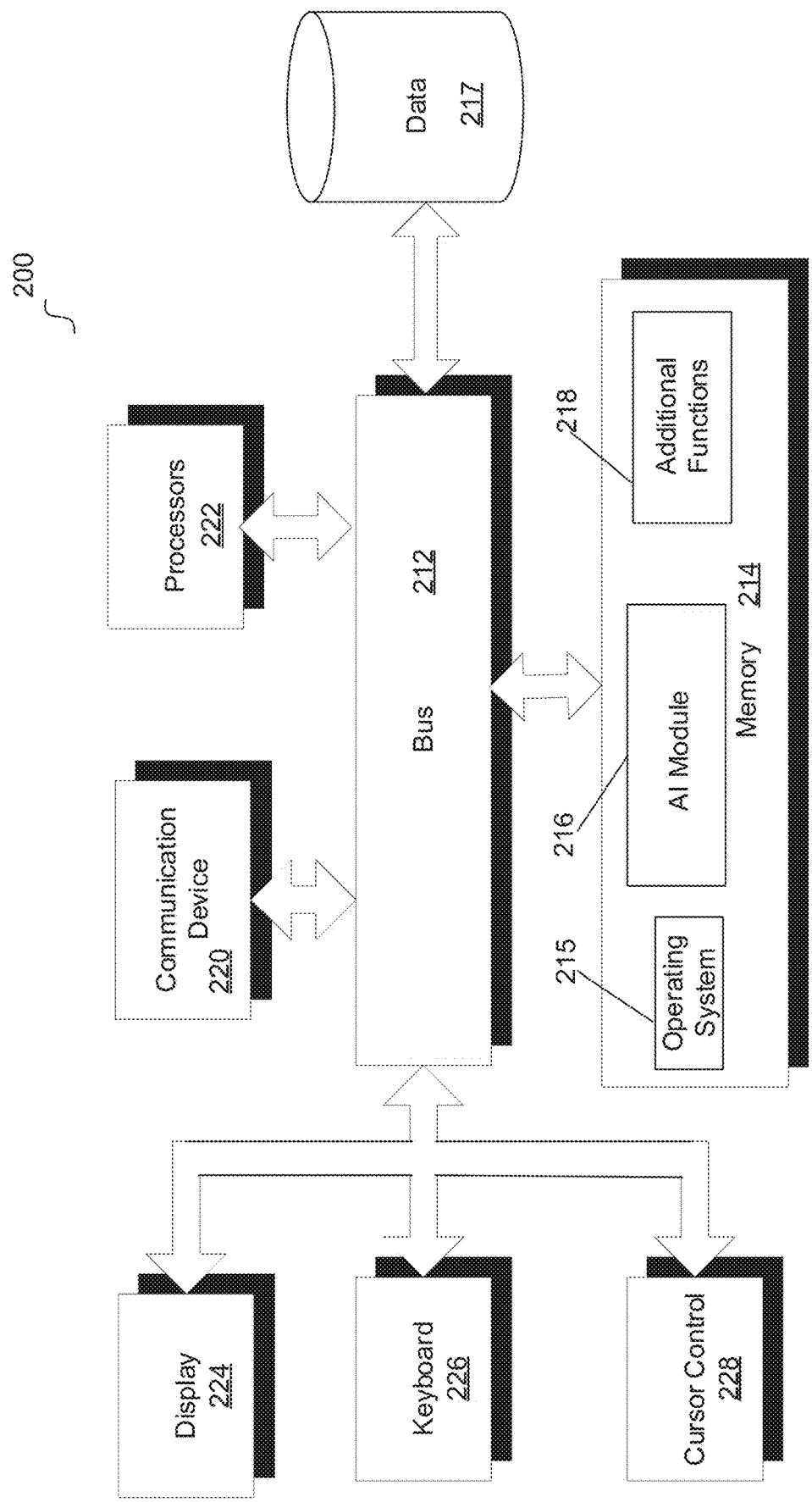
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, AI module 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, AI module 216 configured to perform dialogue flow navigation and all other functionality disclosed herein, as well as other applications modules 218. Operating system 215 provides operating system functionality for system 200. In some instances, AI module 216 may be implemented as an in-memory configuration. In some implementations, when system 200 executes the functionality of AI module 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Cloud Infrastructure, Oracle® Cloud Platform, Oracle® Cloud Applications, for example. AI module 216, other applications module 218, and any other suitable component of system 200 can include various modules of Oracle® Retail Advanced Science Cloud Service, Oracle® Intelligence Bots, Oracle® Digital Assistant, and other suitable frameworks/services.

A database 217 is coupled to bus 212 to provide centralized storage for modules 216 and 218 and to store, for example, data AI module 216 or other data sources. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component. Further, when implemented to execute functionality disclosed herein, system 200 is a special purpose computer, specially adapted to provide AI chat session functionality.

Figure 3:
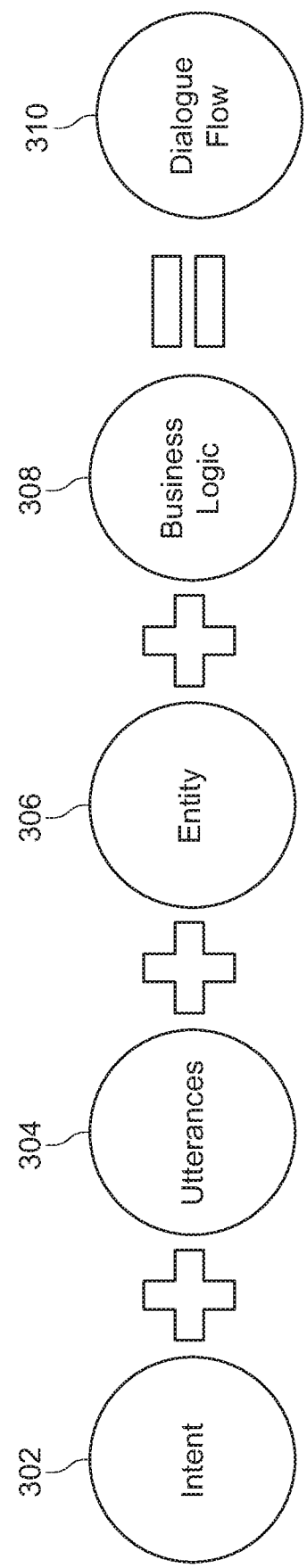
FIG. 3 illustrates a diagram implementing a dialogue flow according to an example embodiment.

FIG. 3 illustrates a diagram implementing a dialogue flow according to an example embodiment. For example, FIG. 3 depicts that dialogue flow 310 includes intent 302, utterances 304, entity 306, and business logic 308. For example, an intelligence bot and/or a combination of other system components can use intent 302, utterances 304, entity 306, and business logic 308 to navigate dialogue flow 310.

In some embodiments, utterances 304 can be received from a user during a chat session with an intelligence bot. Using utterances 304, intent 302 can be recognized from among a plurality of intents by a trained intelligence bot. For example, intents can be permutations of typical user requests and statements, or utterances 304. In some embodiments, the intelligence bot can be trained to recognize a given intent using example text that indicates the given intent. The trained intelligence bot can recognize intent 302 from among a plurality of intents when utterances 304 resemble the examples for intent 302 used to train the intelligence bot. A rich set of example utterances enables an intelligence bot to understand what the user wants. For example, an intent from the utterance "Show me optimization results for location Boston" can be recognized and distinguished from other predefined intents.

Intents allow the intelligence bot to understand what the user wants it to do. For example, an intent can categorize typical user requests by the tasks and actions that a bot performs. A sample intent for an embodiment that uses an enterprise application with retail optimization can be an optimization summary intent, which is associated with a direct request, review optimization summary.

In some embodiments, an intent can be created for recognition based on a compilation of utterances for a particular action, for example a robust data set of text (e.g., one to two dozen utterances). The compilation of utterances can also be varied so that the trained intelligence can interpret ambiguous user input. For example, a rich set of utterances enables an intelligence bot to understand what the user wants among user messages with different structures, tones, syntax, and the like.

An intent can also be considered as an illustration of a use case, as an intent describes the various actions that an intelligence bot helps its users complete. Intents not only describe what an intelligence bot can do, they are also used by the intelligence bot to recognize user input because each intent has a set of utterances associated with it. The following represent example intents:

Intents can be created for a typical pricing user.

Exception management. For example, a user can ask to see the locations for a department where the margin improvements are lower than 5%.

Approval process. For example, reject the price recommendations for runs that have a discount higher than 40% or approve all batch runs that show an improvement of 5% for revenue.

Recalculate the key performance metrics. For example, reject recommendations that have a discount higher than 70% and recalculate the metrics.

A recognized intent can be associated with a data document (e.g., markup language document or data description language document) that defines a dialogue flow for the intent. For example, intent 302 can be associated with a data document that includes variables, states, and transitions. Entity 306 can be context for intent 302, and the context is used with the data document to navigate the dialogue flow. For example, while intents map words and phrases to a specific action, entities add context to the intent itself. They help to describe the intent more fully and enable an intelligence bot to complete a user request. An example of entity 306 is location Boston in the utterance "show me optimization results for location Boston".

In some embodiments, the data document can include variables that are used to navigate the dialogue flow. For example, the dialogue flow may involve retrieving a certain cross-section of enterprise data. The variables may thus include parameters that define the cross-section of enterprise data. In an example, the data document may be structured such that the intelligence bot obtains one or more values for the parameters in order to construct a retrieval request to return the desired data.

In some embodiments, user variables can also be used to navigate the dialogue flow. For example, a user variable can include a user identity, role, preference, and the like. Other variables, such as context variables for the software application or a status of the software application, can also be passed to navigate the dialogue flow. For example, session and/or user scoped variables can be defined in a dialogue flow. These variables can be part of a custom component that is used to communicate information between the software application and an intelligence bot engine (e.g., via a REST API).

In some embodiments, variables can include alphanumeric values, email addresses, a specific time, a duration of time, a phone number, a uniform resource locator, and the like. Variables can also include a value list, such as a list of user input that may indicate a similar concept, an entity list, such as a super set of entities, derived variables, where one variable is derived from another, or regular expressions, which can allow an intelligence bot to identify pre-defined patterns in user input. Entity 306 can include one or more of these variables.

Business logic 308 can include the business intelligence used by the intelligence bot to navigate the dialogue flow and to perform actions for the user. For example, some states, transitions, and/or functions called within the data document can be structured in accordance with business considerations, such as according to the data schema of enterprise data that is desired for retrieval, according to the structure of a batch process that is being configured by navigating the dialogue flow, or any other suitable considerations. In some embodiments, intelligence bots can use custom components when returning data from a transactional data store and/or when executing business logic, such as an instance of an intelligence bot that is fetching summary results for location Boston from an enterprise database.

In some embodiments, the data document can be a markup language document. For example, the data document can implement a predefined YAML Ain't Markup Language ("YAML") structure, where the intelligence bot is configured navigate the dialogue flow based on the predefined YAML structure. Any other suitable data document can be similarly implemented.

Below is an example data document definition for a resolved intent that relates to a simplified version of ordering a pizza, where the data document is used to configure an intelligence bot to navigate a dialogue flow with a user to complete a pizza order:
platformVersion: "1.0"
main: true
name: "PizzaBot"
parameters:
age: 18
context:
  variables:
    size: "PizzaSize"
    type: "PizzaType"
    crust: "PizzaCrust"
    iResult: "nlpresult"
    sameAsLast: "YesNo"
states:
  intent:
    component: "System.Intent"
    properties:
      variable: "iResult"
      confidenceThreshold: 0.4
    transitions:
      actions:
        OrderPizza: "checklastorder"
        CancelPizza: "cancelorder"
        unresolved Intent: "unresolved"
  checklastorder:
    component: "System.ConditionExists"
    properties:
      variable: "user.lastsize"
    transitions:
      actions:
        exists: "lastorderprompt"
        notexists: "resolvesize"
lastorderprompt:
  component: "System.List"
  properties:
    options: "Yes,No"
    prompt: "Same pizza as last time?"
    variable: "sameAsLast"
  transitions: { }
rememberchoice:
  component: "System.ConditionEquals"
  properties:
    variable: "sameAsLast"
    value: "No"
  transitions:
    actions:
      equal: "resolvesize"
      notequal: "load"
load:
  component: "System.CopyVariables"
  properties:
    from: "user.lastsize,user.lasttype,user.lastcrust"
    to: "size,type,crust"
  transitions: { }

Below is another example data document definition for a resolved intent that relates to an enterprise software implementation, as described in various embodiments of the disclosure.
platformVersion: "1.0"
main: true
name: "optimization Flow"
context:
  # Define variables such as iResult, iResult2, commonActionType, nextAction, taskflowId, moduleExtKey, locationExtKey, productExtKey, seasonExtKey, runTypeExtKey, runActionExtKey, run ExtKey, yesOrNoExtKey, actionType primaryKey, copyFlag, recommendationType, recommendationAction, recomDiscountCriteria, recomTypeExtKey, metricsTypeExtKey, metricCriteria, metricType, runApprovalOption
states:
  init:
    component: "commonGreeting"
    properties:
      botType: "CHATBOT"
      commonActionType: "INITIALIZE"
    transitions: { }
  Intent:
    component: "System.Intent"
    properties:
      confidenceThreshold: 0.4
      variable: "iResult"
    transitions:
      actions:
        unresolved Intent: "Unresolved"
        Greeting: "greeting"
        Reset: "reset"
        SummaryOptimization: "displayOptimization"
        CopyOptimizationRun: "askLocationRun"
        ApproveOptimizationRun: "askLocationRun"
        BatchOptimization Run: "askLocationRun"
        OptimizationRun Metrics: "askToApproveSingleOrMultipleRuns"
        Optimization Locations: "askDepartmentForBuyer"
  Intent1:
    component: "commonGreeting"
    properties:
      commonActionType: "RESOLVE INTENT"
    transitions:
      next: "ResolveIntent"
  ResolveIntent:
    component: "System.Intent"
    properties:
      confidenceThreshold: 0.4
      variable: "iResult2"
      sourceVariable: "intentCheckText"
    transitions:
      actions:
        unresolved Intent: "Unresolved"
        Greeting: "greeting"
        Reset: "reset"
        SummaryOptimization: "displayOptimization"
        CopyOptimizationRun: "askLocationRun"
        ApproveOptimizationRun: "askLocationRun"
        BatchOptimizationRun: "askLocationRun"
        OptimizationRunMetrics: "askToApproveSingleOrMultipleRuns"
        Optimization Locations: "askDepartmentForBuyer"
  greeting:
    component: "commonGreeting"
    properties:
      botType: "CHATBOT"
      commonActionType: "INITIALIZE"
    transitions:
      next: "checkModule"
  Unresolved:
    component: "System.CommonResponse"
  checkModule:

```
component: "System.ConditionEquals"
properties:
    source: "${iResult.value.entityMatches['module-
        ExtKey'][0]!}"
    value: "RETAIL"
transitions:
    actions:
        equal: "askModule"
        notequal: "displayOptimization"
askModule:
    component: "System.List"
    properties:
        options: "${moduleExtKey.type.enumValues}"
        prompt: "Are you asking about Assortment and
            Space or Offer Optimization?"
        variable: "moduleExtKey"
    transitions:
        actions:
            PRO: "displayOptimization"
displayOptimization:
    component: "retailOptimization"
    properties:
        runTypeExtKey: "interactive"
        runActionExtKey: "SUMMARY"
    transitions:
        actions:
            askLocationRun: "askLocationRun"
            askCopyorApproveRun:   "askCopyorApprov-
                eRun"
askLocationRun:
    component: "System.Text"
    properties:
        prompt: "Which location are you interested?"
        variable: "locationExtKey"
        maxPrompts: 1
    transitions:
        actions:
            next: "displayBatchOptimization"
askCopyorApproveRun:
    component: "System.List"
    properties:
        options: "${actionType.type.enumValues}"
        prompt: "Promotion recommendations are lower
            than 40% discount! Would you like to send tar-
            geted offers to Platinum Customers"
        variable: "actionType"
        maxPrompts: 1
    transitions:
        actions:
            COPY: "optimizationRun"
            APPROVE: "optimizationRun"
optimizationRun:
    component: "retailOptimization"
    properties:
        runTypeExtKey: "interactive"
        runActionExtKey: "${actionType.value}"
    transitions:
        actions:
            askTargetedOffer: "askTargetedOffer"
# other example states can include askTargetedOffer, ask-
LocationRunWithDisplay, askCopyRun. copyRun, copy-
Message,  askToApproveSingleOrMultipleRuns,  ask-
LocationForMetrics,        askDepartmentForMetrics,
displayRunMetrics,   askAcceptorRejectRecommenda-
tions, resetLocationAndProductKey, askToAcceptorRe-
jectRecommendations, askRecommendationType, ask-
DiscountCriteria,    acceptOrRejectRecommnedations,
resetYesNoAfterAccept, askRecalculateMetric, recalcu-
lateMetric, askAcceptorRejectRecommendations, and
askToSendOffersToCustomer.
displayBatchOptimization:
    component: "retailOptimization"
    properties:
        runTypeExtKey: "batch"
        runActionExtKey: "SUMMARY"
        locationExtKey: "${locationExtKey.value}"
    transitions:
        actions:
            askCopyRun: "askCopyRun"
sendOffersToCustomer:
    component: "retailOptimization"
    properties:
        runTypeExtKey: "batch"
        runActionExtKey: "APPROVE"
    transitions:
        next: "reset"
# Other example states can include askDepartmentFor-
Buyer, askMetricType, askMetricCriteria, displayOptimi-
zation Locations, askToShowRunSummary, resetYesNo-
AfterLocations,             askLocationForApproval,
askDepartmentToApproveAllBatchRuns,   approveAll-
Batch Runs, askDepartmentToApproveAllBatchRuns,
and the like
```

In some embodiments, the example dialogue flow can include context, default transitions, and states, and can also include custom components (e.g., used to communicate with external components and/or components of an enterprise software application). Below are examples (e.g., common-Greeting and retailOptimization) of custom components in the dialogue flow. For example, each component can take properties as the variables that are passed to custom components from (e.g., from the bot services) to take actions. In some embodiments, the custom component, after processing the request, can update the context variables and send them to the bot services in a response.

```
init:
    component: "commonGreeting"
    properties:
        botType: "CHATBOT"
        commonActionType: "INITIALIZE"
    transitions: { }
sendOffersToCustomer:
    component: "retailOptimization"
    properties:
        runTypeExtKey: "batch"
        runActionExtKey: "APPROVE"
    transitions:
        next: "reset"
```

Figure 6B:
Figure 6C:
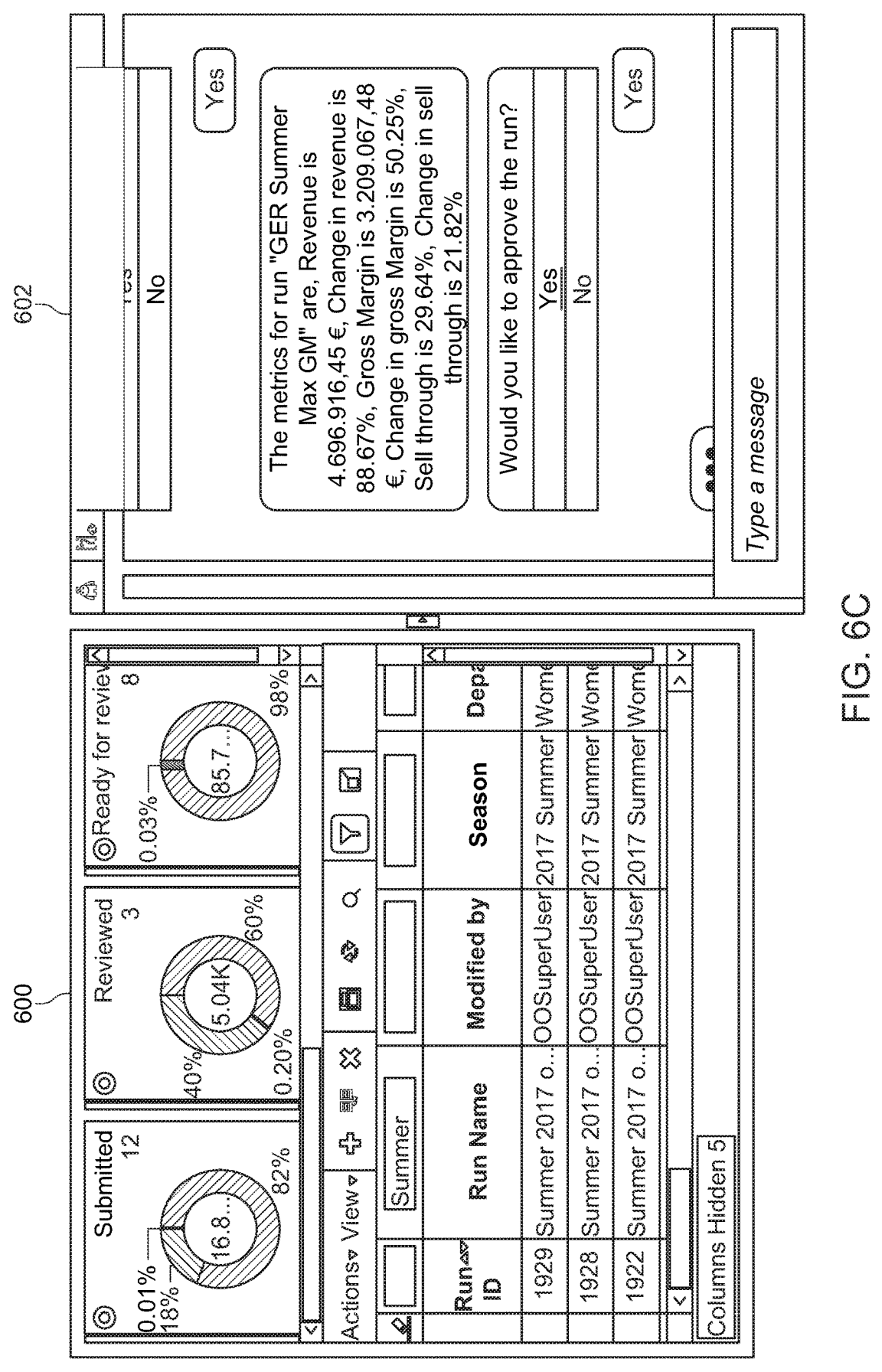

In combination, intent 302, utterances 304, entity 306, and business logic 308 can be used to navigate dialogue flow 310 and/or to perform relevant actions for the user. In some embodiments, the intelligence bots can be transactional bots, such as in a Retail Conversational AI setting, that interact with a retail data warehouse (e.g., database storing enterprise data) to review key performance indicators ("KPIs") and business performance by asking questions. These intelligence bots can maintain context over the conversation and can be integrated within a retail enterprise application flow. These intelligence bots enable a retailer to have interactive conversations within a UI workflow, where end users are provided with varied response within the enterprise application, such as simple text messages with KPIs, multiple choices for user selection, or guidance to other screens based on the system state. FIGS. 6A-6C provide illustrations of an example implementation.

In some embodiments, a chat session can be integrated with a voice assistant (e.g., Echo, Google Home, Chrome voice assistant, and the like), machine learning techniques (e.g., natural language processing), and enterprise software (e.g., Oracle® Retail Offer Optimization, and the like). Such an implementation can reduce the effort for a typical user of the enterprise software application and can include handling of complex business process use cases.

In the current versions of enterprise retail software, complex business use cases, such as pricing decisions/optimization, are not integrated with voice assistants/intelligence bots to handle complex workflow/business process questions. For example, buyers or managers who manage price recommendations for a retail apparel would be interested in use cases such as exception management (e.g., show me the locations for a department where the margin improvements, based on the price recommendations, are lower than 5%), complex approval process (e.g., reject the price recommendations that are higher than 40%, recalculate the key-performance metrics, send the targeted offers to my platinum customers) or aggregations on the fly (e.g., what is margin improvement for US? Germany?). In some embodiments, a user can verbally express a particular question (utterance) to a voice enabled device and the utterance can be converted into text and mapped to an intent/entity using Natural Language Processing ("NLP") algorithms (e.g., as implemented by Oracle® Intelligent Bots). In some examples, once the intent/entity has been resolved and a dialogue flow has been navigated, a pricing solution can be called (e.g., Oracle® Retail Offer Optimization), which can perform the appropriate processes and return information.

Embodiments can reduce the effort required from a user to undertake certain complex business processes while also, based on the voice-enabled capabilities, add the ability for the user to speak in a natural language to the enterprise business software application. For example, business users, who are typical users for such software, can speak to the enterprise business software application about their business use cases.

Embodiments include a trained and integrated intelligence bot (e.g., implemented using Oracle® Digital Assistant), to answer specific questions that arise for a typical user, for example in a pricing software solution. For example, buyers or managers who manage price recommendations for retail apparel might be interested in use cases such as:

Exception management. For example, a user can ask to see the locations for a department where the margin improvements are lower than 5%.

Approval process. For example, reject the price recommendations for runs that have a discount higher than 40% or approve all batch runs that show an improvement of 5% for revenue.

Recalculate the key performance metrics. For example, reject recommendations that have a discount higher than 70% and recalculate the metrics.

Q&A. This integration helps in answering a user's most frequently asked questions. For example, a user can ask about promotions and the Q&A tab brings up the relevant questions and answers related to the term "promotions."

Some embodiments can include the following:
1. A user can enable a voice assistant (e.g., by clicking a microphone symbol).
2. A user can speak a particular question (utterance) to the voice-enabled device.
3. The utterance can be converted into text using NLP algorithms, after which an intent and corresponding entities can be resolved from the utterance. For example, a trained intelligence bot can be used to recognize the intent for the use cases mentioned above. The trained intelligence bot can also be used to asks appropriate follow-up questions to arrive at the intent.
4. Once the intent/entity has been resolved, a dialogue flow can be navigated and an enterprise software application (e.g., Oracle® Retail Offer Optimization) can be called, which then performs the appropriate processes.
5. Once the processes are completed, the enterprise software application can return the information.

One or more intents can be created for different use cases to aid a user in achieving the related functionality. In addition, one or more intelligence bots can be trained to recognize the created intents. For example, a user can ask to see locations for a department which do not meet approval criteria, or a user can ask to see the locations for a department where the margin improvements are lower than 5%. As described herein, example utterances for each intent can be provided to train the intelligence bot.

Embodiments can implement multiple training techniques. For example, a Trainer Ht technique can be used which derives combination of generative rule templates based on the provided set of example utterances using NLP-based linguistics. This can help an intelligence bot with rapid deployment and can result in highly accurate predictions. Trainer Ht can be used with a small training corpus (e.g., 10-20 utterances for a created intent), can leverage NLP based linguistics to recognize intents, and can use matchings rules to create templates and distinguish intents.

Another training technique, Trainer Tm, can be used when a larger volume of conversational data is available. Trainer Tm can be a good fit where generalization for intent prediction is desired and implementers have built a quality initial data set for conversation flows. These models can use a combination of algorithms which perform unsupervised learning from large amounts of unlabeled text to produce context sensitive mappings for user-intent prediction based on the data collected over the time by end-user in a retail enterprise application.

Apart from providing the training data specific to pricing solution, other suitable NLP processing techniques can be used as well, such as techniques that an recognize the sample phrases that belong to each intent, and as well as phrases similar to those. For example, the NLP techniques implemented by Oracle® Digital Assistant can be used. In some embodiments, NLP algorithms that perform word analysis and semantic analysis can be leveraged. For example, a match engine can analyze user expressions or statements grammatically and semantically to understand the intention of the user.

In some embodiments, NLP techniques can include spelling correction, lemmatization (e.g., forms of a word can be associated with one general or base form of the word known as a lemma), stemming (e.g., ends of words can be removed in order to derive the base word, for example, cats becomes cat), synonym lookups, hypernyms and hyponyms analysis (e.g., parent-child relationships, or something which is a type of a class, respectively, such as color being a hypernym of red, and a spoon being a hyponym (type-of) of cutlery), detection of multi word units, resolving lexical ambiguity (e.g., using knowledge of specific industry segments and users to resolve ambiguity, such as in the financial domain, bank referring to a financial institution, not to a riverside bank), semantical analysis, and other suitable NLP techniques.

In addition to training, entities can also be defined for an intent. For example, in some cases, context can be used to enable an intelligence bot to complete a user request. Depending on the use case and the request, entities like location, merchandise, and the like can be added. For example, for an intent related to finding runs that do not meet the approval criteria, the following entities can be included: locations, departments.

Once the training and entities are defined, custom components can be integrated, such as custom business logic and/or functions (e.g., REST API calls). Embodiments include defining the dialogue flow using a data document (e.g., markup language data document or a similar data definition document), where the intelligence bot can use the training, entities, custom components/business logic, and defined data document to navigate the dialogue flow with the user.

Figure 4:
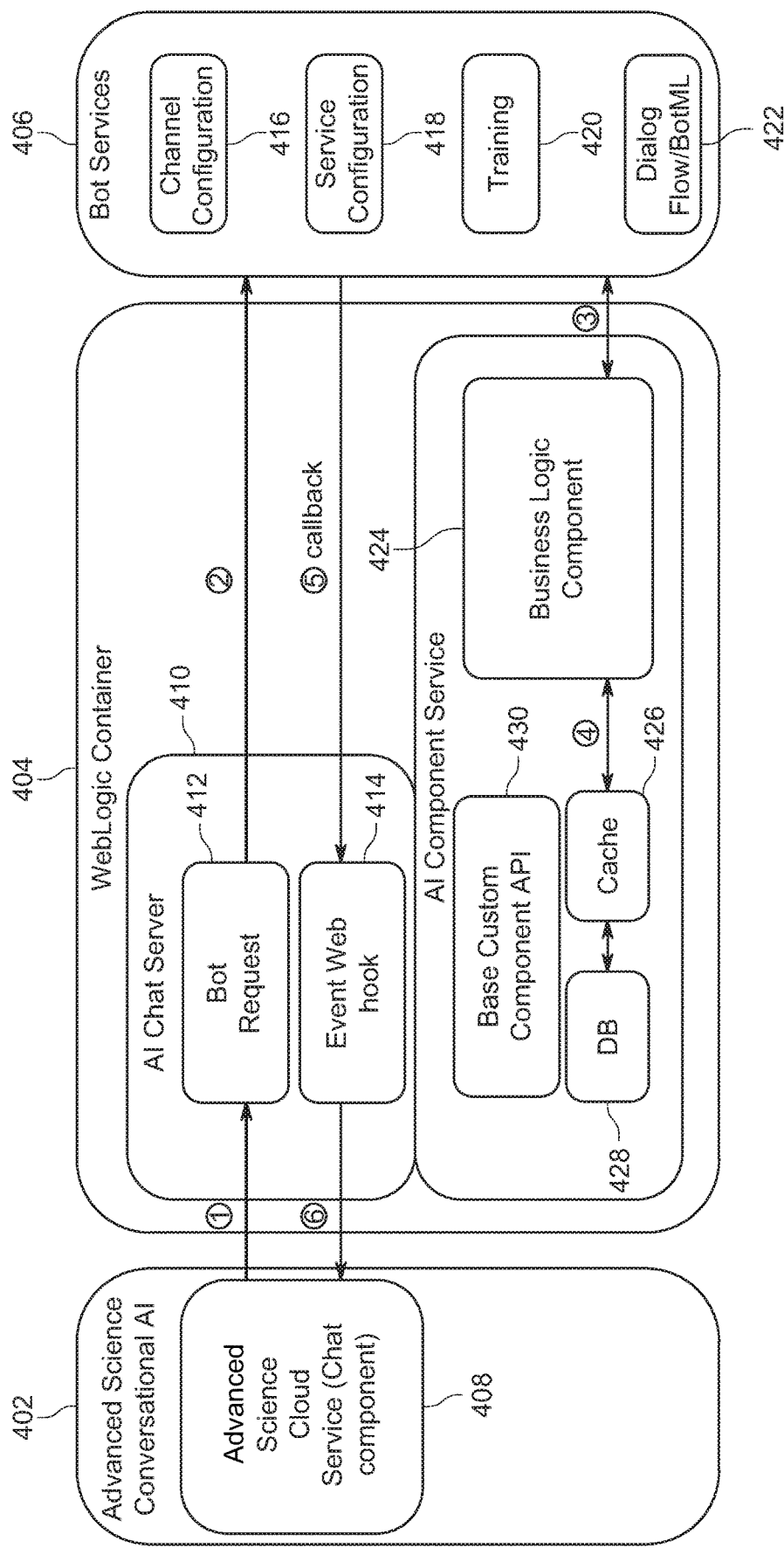
FIG. 4 illustrates a system for implementing a dialogue flow using a trained intelligence bot and business logic according to an example embodiment.

FIG. 4 illustrates a system for implementing a dialogue flow using a trained intelligence bot and business logic according to an example embodiment. The system includes enterprise AI Client 402, weblogic container 404, bot services 406, advanced science cloud service chat component 408, AI chat server 410, bot request 412, event web hook 414, channel configuration 416, service configuration 418, training component 420, dialog flow 422, business logic component 424, cache 426, database 428, and custom component API 430.

Enterprise AI Client 402 can have an integrated voice enabled solution that allows a user to either ask questions or type questions to get responses and to display history of the questions and response for user to view (e.g., a chat display). Enterprise AI Client 402 can use, for example, a Speech Recognition Kit in Google® Chrome to convert speech to text, or can use any other suitable technology, service, or framework. Enterprise AI Client 402 can be displayed in a user interface (e.g., in the contextual area) that allows a user to ask questions in context of the user workflow. An example of such queries from client are "what promotions are running at store XYZ" while reviewing targeted offer in offer optimization workflow. Enterprise AI Client 402 can also provide the ability to reset and restart conversations with enterprise application by resetting context from the UI.

Weblogic container 404 and AI chat server 412 can relay client queries to bot service 406 by appending application context and/or security roles to the client request. For example, client queries can be simple request or can have criteria to get details, an example of such query criteria can be show promotion in store YY or department XX. Weblogic container 404 and AI chat server 412 can also provide bot service 406 with enterprise data using base custom component API 430, business logic component 424, cache 426, and database 428.

Bot services 406 can include a composite of dialogue flows that define conversation and transition states. These dialogue flows can be configured for business use cases and can rely on built-in components and/or can have component-controlled navigation that relies on enterprise specific components to display messages in sequence and transition to a next state. Bot service 406 can use training component 420 to train the model periodically in batch by using data collected over the past usage of the bots. In some embodiments, these component layers can interact with each other (e.g., using REST application programming interfaces ("APIs") and share messages (e.g., JSON object messages) with AI chat server 410 acting as mediator, which can be deployed as a web application on Java Enterprise Server. In some embodiments, the enterprise application can share application context with bot services 406, such as the logged in user, their roles, what application or module is currently display in/navigated to in the UI.

In some embodiments, enterprise AI client 402 can send a bot request to web logic container 404, which can relay the request to bot services 406. Channel configuration 416 and/or service configuration 418 can be used to configure the chat session with an intelligence bot. In some embodiments, navigation of a dialogue flow (e.g., dialogue flow 422) may call for a business logic component, and base custom component API 430, business logic component 424, cache 426, and database 428 can be used to perform a business operation and/or return enterprise data. Event web hook 414 can be configured and used to relay information back to enterprise AI client 402, as depicted in FIG. 4.

In some embodiments, an example call to base custom component API 430 can include:

```
"context": {
  "variables": {
    "location": {
      "type": "string",
      "value": null,
      "entity": false
    },
    "system.errorAction" {
      "type": "string",
      "value": null,
      "entity": false
    },
    "system.errorState" {
      "type": "string"
      "value": null,
      "entity": false
    } } },
  "properties" {
    "location": "San Francisco"
  },
  "message": {
    "payload" : {
      "text" : "What stores are near me?"
    },
    "retryCount" : 0,
    "channel" : {
      "botId" : "963B57F7- CFE6-439D- BB39- 2E342AD4EC92",
      "sessionId" : "1769641",
      "type" : "test",
      "userId" : "1769641",
      "channelId" : "18DE5AEF-65A4-4616-BI4D-0A4BCF1D6F71"
    },
    "tenantId" : "DefaultOliveTenant",
    "createdOn": "2017-01-20T00: 23: 53. 5932",
    "id" : "8c9556b2-9930-4228-985e-f972bfc fe26d"
  } }
```

In some embodiments, an example response to the call from base custom component API 430 (e.g., after retrieving data and/or performing actions with business logic component 424, cache 426, database 428) can include:

```
"context" : {
  "variables11: {
    "location" : {
      "type" : "string",
      "value" : "San Francisco",
      "entity" : false
    }.
    "svstem.errorAction" : {
      "type" : "string",
```

```
    "value" : null,
    "entity" : false
    }.
    "system.errorState" : {
        "type" : "string",
        "value" : null,
        "entity" : false
    } } }
    "action" : null,
    "exit" : false ,
    "done" : false,
    "error" : false,
    "modifyContext" : false
```

In some embodiments, bot services 406 can transmit a request with a custom component and one or more parameters, along with context variables maintained by the bot service. Base custom component API 430 can retrieve the relevant information (e.g., from transaction database using JDBC) or can communicate with other components to fetch data. In some embodiments, based on the parameter passed, base custom component API 430 can then update context variables and construct the response to send back to bot services 406. This response can include data, a success or error response, and/or a next action that bot services 406 should take.

In some embodiments, a user chat can start with a user prompt which is sent to bot service 406, where the intent is resolved using NLP algorithms or machine learning models. After the intent is resolved bot service 406 can invoke one or more components to get real time enterprise data, where such data and a next transition state can be returned as a response back to bot service 406. Transition states can be resolved to either take next action and/or provide user with a response message, which is displayed in the chat window. In some embodiments, a response message can be multiple choice for selection, a simple message, or it can guide the user to another screen in the enterprise application. A dialogue flow in bot service 406 can be designed to have exception flows configured to guide the user if intents are not resolved or prompt the user to provide further clarity.

Figure 5A:
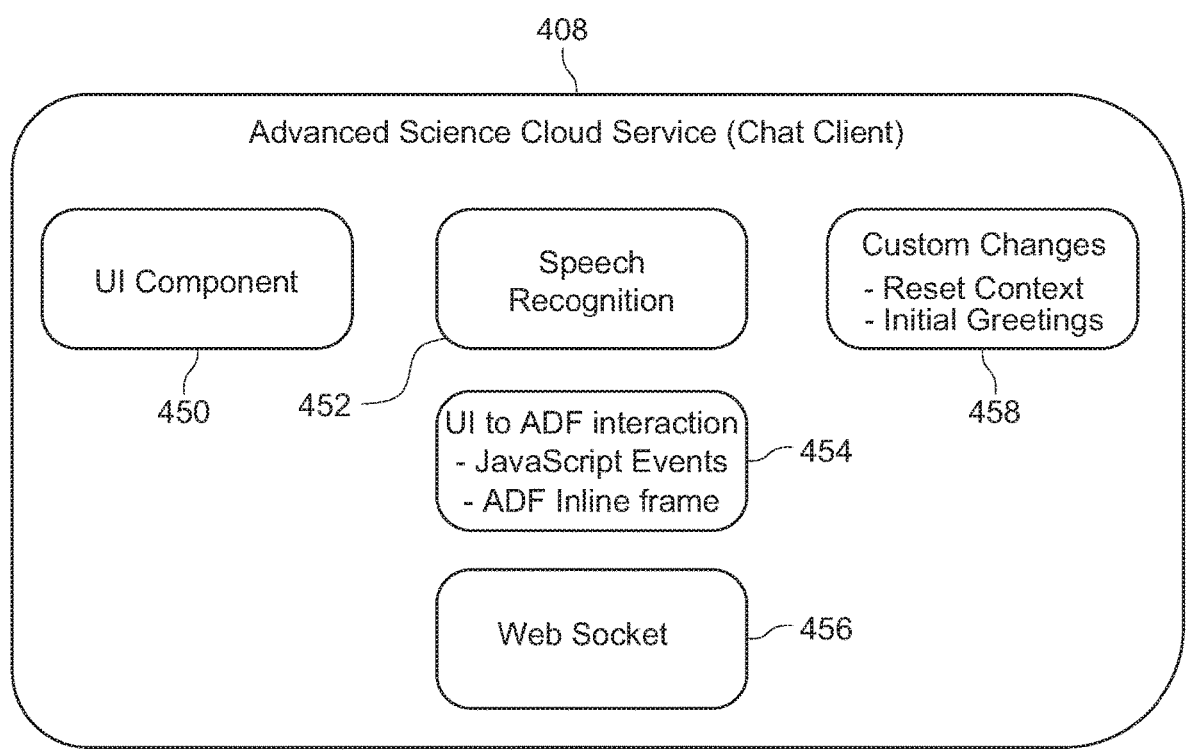
FIG. 5A illustrates a system component for implementing a dialogue flow using a cloud service client according to an example embodiment.

FIG. 5A illustrates a system component for implementing a dialogue flow using a cloud service client according to an example embodiment. FIG. 5A depicts advanced science cloud service chat component 408, which can include UI component 450, speech recognition component 453, custom changes component 458, UI to ADF interaction 454, and web socket 456. UI component 450 can display the chat client in an interface at the client and/or within a UI of an enterprise application (e.g., a chat window, as depicted in FIGS. 6A-6C). Speech recognition 452 can recognize natural language speech and can include Speech Recognition Kit in Google® Chrome, or any other suitable component. Custom changes 458 can include custom implementation for a chat session at the client.

For example, a chat can start with an enterprise application greeting and by setting context for a conversation, which can be followed by utterances from a user that are resolved at bot service 406 and transitioned to conversation. Custom changes 458 can implement custom greetings and/or custom reset conditions to reset context. For example, a JavaScript reset method can be added to clear messages from the chat client. Once the messages are cleared, a "reset" utterance mapped to a reset intent can be pushed to bot service 406 to reset variables. In some embodiments, a JavaScript init hello message can be added to the chat client while initializing the web socket connection.

In some embodiments, an application data framework ("ADF") can interact with application/UI components. For instance, while conversing with an intelligence bot, a message can be sent from a custom component to bot server 406, which then returns results as a callback to the channel webhook. These parameters can then be passed to a composite component, which can pass these parameters to a JavaScript parent window (e.g., an ADF component). This component can then call a backing bean (e.g., to open a taskflow). In some embodiments, JavaScript is added to convert speech to text and then text is pushed to the bot server 406, which can be similar to the way typed text messages are delivered. The chat client can communicate with the chat server using web socket 456.

Figure 5B:
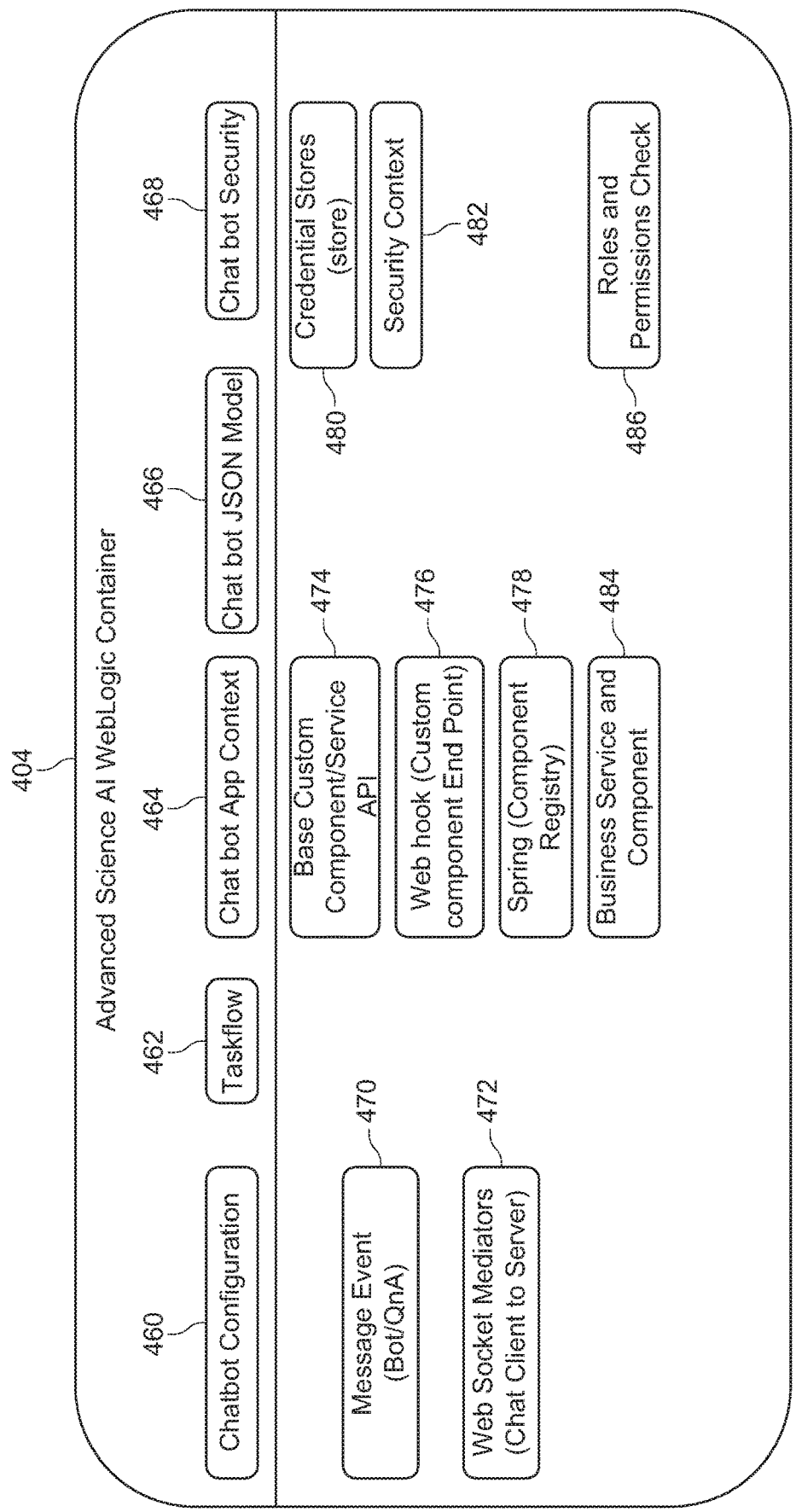
FIG. 5B illustrates a system component for implementing a dialogue flow using a web logic container according to an example embodiment.

FIG. 5B illustrates a system component for implementing a dialogue flow using a web logic container according to an example embodiment. FIG. 5B depicts web logic container 404, which can include chat configuration 460, taskflow 462, chat context 464, chat JSON model 466, chat security 468, message event 470, web socket mediators 472, base custom component API 474, web hook 476, component registry 478, credential store 480, security context 482, business services and component 484, and roles and permissions 486.

Chat configuration 460 can configure the chat with a channel id and other pertinent configuration information. Taskflow 462 can include taskflow metadata that can be used to integrate with UI components and an enterprise software application. Chat context 464 can include contextual data for the chat session, including user context, enterprise application context, and the like. Chat JSON model 466 can include the data description for configuring the intelligence bot to guide the user (e.g., data description for a dialogue flow data document).

Chat security 468 can include managing roles, such as a viewing role and a service role (e.g., granted to limited users registered with bot service 406). Credential store 480 can store channel secret keys used to maintain security over chat sessions, and security context 482 can ensure user roles are verified by external custom components (e.g., custom components of the enterprise application).

Message event 470 can represent message between the user and the intelligence bot (e.g., messages received from bot service 406 as a callback). In some embodiments, this is implemented using a secure sockets layer ("SSL") protocol. Web socket mediators 472 can receive messages from the chat client and push data to bot service 406. Base custom component API 474 can be used to read message payloads from a custom component (e.g., component of the enterprise application that returns enterprise data). Web hook 476 is configured as part of the channel configuration. Component registry 478 can use a Spring application context as a registry, which can indicate which service/component to invoke from the common layer and delegates to the business layer.

In some embodiments, a question and answer ("Q&A") intelligence bot is also configured. Q&A bots can rely on a predefined set of questions and answers to guide users and customer service with in context questions. Q&A bots can rely on elastic search to resolve intent using built-in rules and inferred rules. This type of bot can minimize customer service engagement as they get prompt response from the enterprise solution and also reduce enterprise development team involvement in responding to repetitive questions across multiple retailers.

Q&A bots can be implemented using master and child bots, which can be resolved based on the context set. In an embodiment, if the enterprise application is retail and it has modules such as Forecasting and Offer Optimization, then the master bot can be configured with logic to switch to a specific Q&A bot for specific intent resolutions. Thus, Forecasting and Offer Optimization are not mixed and are separated in different bots.

In some embodiments, custom components can be used to resolve intent after component navigation. For example, some dialogue navigations can be resolved by an intelligence bot. An example of component navigation is when a custom component displays multiple messages in sequence and then asks an intelligence bot to transition to a next state using an action. The below illustrates an example embodiment:

User: Show me optimization results.
Bot: (Call custom component, and custom component returns list of messages with metrics for the optimization results, along with next action to prompt user with a question (if they would like to approve or copy results?))
User: Show me optimization results (again)
Bot: With custom controlled-navigation intelligence bot is able to resolve the intent correctly and displays
(Call custom component, and custom component returns list of messages with metrics, along with next action to prompt user with question (if they would like to approve or copy results?))

In some embodiments, navigating the dialogue flow can include dialogue navigation and custom component navigation. For example, in dialogue navigation intents can be resolved by the intelligence bot (e.g., using the defined dialogue flow and example utterances), while in custom component navigation intent resolution can be forwarded from a custom component to the intelligence bot (as illustrated in this disclosure). In the above example of custom component navigation, a custom component displays multiple messages in sequence (e.g., without user action interim), and when the user prompts, the custom component has the responsibility to configure the intelligence bot to resolve the user intent. In some embodiments, the navigation of dialogue flows can include dialogue navigation and custom component navigation (e.g., in combination).

Additional example text that illustrates the navigation of multiple example dialogue flows follows:

Sample Conversation: Country-Level View for All Departments
User: "I would like to see how my stores in US are performing."
Bot: "Okay. It seems as if you want to take a look at the country-level metrics for stores. Please specify the location from the following: <America, Europe, E-commerce US>?"
User: "America."
Bot: "Do you want to review a specific department or all departments?"
User: "All departments."
Bot: "Aggregated metrics for the specified location(s) and all departments are: Revenue is 2756451.736, Change in Revenue is −1.49%, Gross Margin is 1868901.003, Change in Gross Margin is −3%, Sell Through is 0.6861, Change in Sell Through is 1.28%."
Sample Conversation: Country-Level View for Selected Departments
User: "I would like to see how my stores in US are performing."
Bot: "Okay. It seems as if you want to take a look at the country-level metrics for stores. Please specify the location from the following: <America, Europe, E-commerce US>?"
User: "America."
Bot: "Do you want to review a specific department or all departments?"
User: "Specific Department."
Bot: "Which department are you interested in?"
User: "Womens Activewear"
Bot: "Aggregated metrics for the specified location(s) and department(s) are: Revenue is 2756451.736, Change in Revenue is −1.49%, Gross Margin is 1868901.003, Change in Gross Margin is −3%, Sell Through is 0.6861, Change in Sell Through is 1.28%."
Sample Conversation: Exception Management
User: "I want to see the locations that do not meet the approval criteria."
Bot: "Okay. It seems as if you are interested in finding exceptions. First, which department are you interested in?"
User: "Womens Activewear."
Bot: "What metric are you looking for: Revenue Improvement, Margin Improvement, Sellthrough Improvement, or Sellthrough?"
User: "Sellthrough."
Bot: "Please specify the threshold (for example, 15%) for identifying the poorly performing locations."
User: "10%."
Bot: "The location for Department Womens Activewear with Sellthrough below 10% is Company."
Bot: "Would you like to see the run summary for this Department and the location?"
User: "Yes."
Bot: "The metrics for run Copy_Of_test are: Revenue is 2756451.736, Change in revenue is −1.49%, Gross Margin is 1868901.003, Change in gross Margin is −3%, Sell through is 0.6861, Change in sell through is 1.28%.
Bot: "Would you like to approve the run—Yes/No?
Depending on what the user answers here, the flow will be different. If the user says "yes," then the user is taken to the Approval Use Case. If the user says "no," then the user is taken to Recalculate Use Case.
Sample Conversation: Approval Use Case
User: "I want to review the metrics and would like to take care of run approvals today."
Bot: "Okay. It seems as if you are interested in approving runs. First, which location are you interested in?"
User: "Company."
Bot: "Which department are you interested in?"
User: "Women's Activewear."
Bot: "The metrics for run Copy_Of_test are: Revenue is 2756451.736, Change in revenue is −1.49%, Gross Margin is 1868901.003, Change in gross Margin is −3%, Sell through is 0.6861, Change in sell through is 1.28%."
Bot: "Would you like to approve the run—Yes/No?"
User: "Yes."
Bot: "The run has been approved, and the offers have been sent to the customers."
Bot: "Please let me know how can I help you with the Offer Optimization application."
Sample Conversation: Recalculate Use Case
User: "I want to review the metrics and would like to see whether to make any changes to the recommendations."
Bot: "Okay. It seems as if you are interested in accepting or rejecting recommendations. First, which location are you interested in?"

User: "Company."
Bot: "Which department are you interested in?"
User: "Women's Activewear."
Bot: "The metrics for run Copy_Of_test are Revenue is 2756451.736, Change in revenue is −1.49%, Gross Margin is 1868901.003, Change in gross Margin is −3%, Sell through is 0.6861, Change in sell through is 1.28%."
Bot: "Would you like to approve the run—Yes/No?"
User: "No."
Bot: "Would you like to ACCEPT/REJECT available recommendations?—ACCEPT/REJECT."
User: "ACCEPT."
Bot: "Would you like to ACCEPT promotion/markdown recommendation?—PROMOTION/MARKDOWN."
User: "Promotion."
Bot: "What is the maximum percent discount criterion to accept Promotion recommendations?"
User: "40%."
Bot: "Promotion Price recommendations below 40% have been accepted."
Bot: "Would you like to recalculate the metrics again—Yes/No?"
User: "Yes."
Bot: "The run has been submitted for recalculating the metrics. To see the new metrics, please query the bot."
Bot: "Please let me know how can I help you next with the Offer Optimization application."

In some embodiments, the chat session can be held in the context of an enterprise application (e.g., in order to perform actions and/or retrieve data associated with the enterprise application). For example, the enterprise application can include an offer optimization functionality (e.g., Oracle® Retail Advanced Science Cloud Services with Offer Optimization). In some embodiments, the enterprise application can include and/or access enterprise data, such as a multi-dimensional enterprise data model. Such a model can include data dimensions, such as product, metric, location, calendar, season, department, and the like. In some embodiments, the dimensions can each include multiple members (e.g., multiple products, organizational metrics, locations, calendar timings, seasons, departments, and the like), and, in some implementations, one or more of these memberships can have a multi-level organizational structure or can be organized as a hierarchy (e.g., products organized under product lines, specific organizational metrics organized under more general metrics, such as in-store returns under returns, specific locations under larger geographic locations, finer calendar timings under larger calendar timings, such as weeks under months, specific departments under more general departments, and the like).

In some embodiments, cross-sections of these dimensions can describe useful information, such as gross sales of a specific product line during a specific time of year in stores within a specific geographic location. Given this example, this information can be retrieved based on a specified cross-section of members of the product, metric, location, and calendar dimensions (e.g., a cross-section specified by the individual members within each of these dimensions that is of interest). Thus, accessing the enterprise data can, in some cases, involve parameters that specify members of the multi-dimensional data model.

In some embodiments, offer optimization can be used to determine recommended pricing for promotions, markdowns, or targeted offers. For example, promotions and markdowns can be at the location level (e.g., price-zone), and targeted offers can consider the location and/or can be specific to each customer. The timing and depth of promotions, markdowns, or targeted offers can impact inventory management over the life cycle of a product. For example, offer optimization can be useful in the following example scenarios:

Bring inventory to the desired level, not only during the full-price selling period but also during the clearance period.

Maximize the total gross margin amount over the entire product life cycle.

Assess in-season performance.

Update recommendations each week. This facilitates decision-making based on recent data, including new sales, inventory, price levels, planned promotions. and other relevant data.

Provide targeted price recommendations at the segment-level.

In some embodiments, offer optimization can be used to enhance a buyer's business strategy, such as for a department, by generating price recommendations. The buyer can specify a business strategy and may want to determine when to offer a promotion, the depth of the promotion, which items to be considered as part of a promotion, and similar questions regarding markdown, keeping in mind certain business rules and inventory levels. In some embodiments, offer optimization can run through different price combinations considering the gain when offering a promotion or markdown and whether to offer any customer-specific promotion which can achieve the optimization objective in an efficient manner. Once the optimization is complete, the run can go into a "Ready for Review" status. A user can review the recommendations (e.g., at each item-level) and decide to accept, reject, or override the recommendation. Once finished, the run status can be changed to "Reviewed". A reviewed run can go to the buyer for approval. If the buyer likes the recommendations, then the buyer can change run status to "Submitted". For example, "Submit" can indicate that the price recommendations are sent to a price execution system or software application.

In some embodiments, an optimization can be carried out at the configured processing (or run) location, merchandise level, and calendar level. Once the optimization is complete, the recommendations can be generated at a lower level than the processing level, called recommendation levels for merchandise level and location level. The location and merchandise level can be any level in the location hierarchy and merchandise hierarchy, respectively. Embodiments include optimization that considers: optimization can be done at one level below the run's merchandise level (e.g., if the run merchandise level is Department, then each job is at the Class level); at the configured recommendation merchandise level, the inventory can be rolled to the desired recommendation merchandise level and/or the inventory can be aggregated across multiple or all the locations to the run's location level; price recommendations can be generated at the recommendation merchandise, location, and calendar level and the customer segment level.

FIGS. 6A-6C illustrate an example dialogue flow according to an example embodiment. For example, enterprise application 600 depicts an enterprise application, such as a retail offer optimization application. Chat window 602 depicts the navigation of a dialogue flow between an intelligence bot and a user, including resolving an intent, navigating custom data layers of enterprise data, retrieving enterprise information, and triggering an enterprise batch process.

Figure 7:
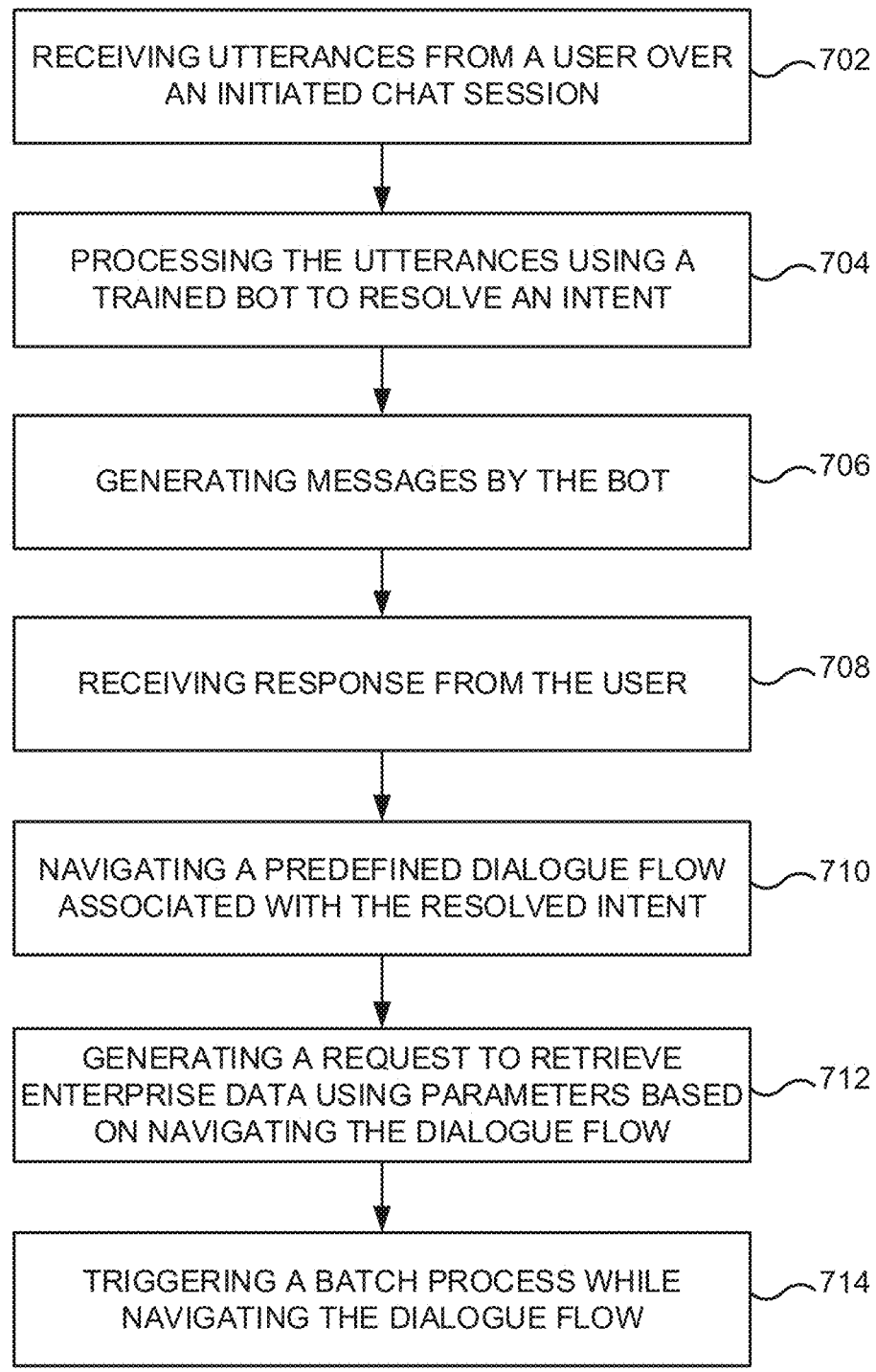
FIG. 7 illustrates a flow diagram for navigating a dialogue flow using a trained intelligence bot according to an example embodiment.

FIG. 7 illustrates a flow diagram for navigating a dialogue flow using a trained intelligence bot according to an example embodiment. In one embodiment, the functionality of FIG. 7 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIG. 7 can be performed by one or more elements of system 200 of FIG. 2.

At 702, upon initiation of a chat session between a user and a trained intelligence bot, one or more utterances can be received from the user. For example, a chat session can be initiated between a user that is interfacing with an enterprise application and an intelligence bot provided by a bot service. Utterances, or language/text that indicates a user intent or use case can be received from the user.

At 704, the utterances can be processed using the trained intelligence bot to resolve an intent from among a plurality of predefined intents, wherein the intelligence bot is trained to resolve predefined intents from user utterances based on training data associated with each of the predefined intents. For example, each intent that the intelligence bot is trained to resolve can be associated with a series of example utterances, or training data. The intelligence bot can be trained using these examples, and thus can distinguish an intent from among the plurality of intents when performing the resolving.

At 706, messages can be generated by the intelligence bot, for example in response to utterances by the user. At 708, responses from the user can be received, for example in response to prompts or messages from the intelligence bot. This communication can involve navigating a predefined dialogue flow associated with the resolved intent, at 710.

For example, the intent can be associated with a data document (e.g. predefined dialogue flow) that defines states, transitions, and variables used by the intelligence bot to navigate a dialogue flow. In an embodiment, the predefined dialogue flow configures the intelligence bot to obtain parameters for a retrieval request from the user, and the parameters are based on the resolved intent that is associated with the predefined dialogue flow. For example, the navigation of the dialogue flow can involve securing parameters that are used for an enterprise action, such as retrieving enterprise data or performing an enterprise batch process.

In an embodiment, navigating the predefined dialogue flow includes generating preconfigured messages from the intelligence bot that prompt the user to input the parameters for a retrieval request. For example, the preconfigured messages can be generated by the intelligence bot while transitioning among the states within the data definition document that defines the dialogue flow. In an embodiment, transitioning from at least a first state of the plurality of states to a second state of the plurality of states can be based on input from the user in response to a first preconfigured message generated by the intelligence bot at the first state. For example, the data definition document can define a transition from the first state to the second state when input from the user in response to the first preconfigured message is of a first category, and from the first state to a third state when input from the user in response to the first preconfigured message is of a second category.

At 712, a retrieval request can be generated to retrieve enterprise data using parameters based on navigating the dialogue flow. For example, the enterprise data can include a cross-section of multidimension data, and navigating the dialogue flow can include the intelligence bot obtaining, from the user, the parameters for retrieval of this multi-dimensional data. A custom function (e.g., REST API) can then be called to retrieve the enterprise data, for instances from an enterprise data store or database.

At 714, a batch process can be triggered while navigating the dialogue flow. For example, the batch process can include approving recommendations for optimized retails offers, running an offer optimization process after editing parameters for the process, such as a threshold for promotions, markdowns, and the like, rejecting recommended offers or a subset of recommending offers, and other suitable batch processes.

FIG. 8 illustrates an integrated supplier, inventory, and logistics system that includes stock management according to an example embodiment. As shown in FIG. 8, system 800 can include an enterprise business system 870 that executes code to manage stock of products for enterprise locations 801-804 using warehouse 880, and to ship products from warehouse 880 directly to consumers. Enterprise business system 870 is in communication through a cloud network 850 or other type of communications network with one or more inventory system 820. In some embodiments, retail offer optimization software of enterprise business system 870 can generate optimized offers for a variety of products. Inventory system 820 and warehouse 880 can execute shipments to and from enterprise locations 801-804 based on these optimized offers. In some embodiments, the use of a customized and trained models can provide improvements to these inventory levels, thus generating a more efficient shipment process.

Inventory system 820 stores inventory and provides transportation logistics to deliver items to enterprise locations 801-804 and to consumer locations (e.g., consumer homes) using trucks 810-813 or some other transportation mechanisms. Inventory system 820 in one embodiment implements an enterprise application specialized computer system or a specialized inventory control system that uses input from enterprise business system 810, such as retail offer optimization software, to determine levels of inventories and the amount and timing of the delivery of products to enterprise locations 801-804.

Warehouse 880 can be a fulfilment warehouse that supplies one or more products to enterprise locations 801-804 based on inventory system 820 and that ships products to consumer locations (e.g., consumer homes). Warehouse 880 in one embodiment implements a specialized computer system or a specialized supplier system that uses input from enterprise business system 810, such as retail offer optimization software, to determine an amount of and timing for product shipments to inventory system 820 and/or enterprise locations 801-804. In some embodiments, for instance based on returns to enterprise locations 801-804, warehouse 880 may receive shipments form enterprise locations, for instance to ensure the enterprise locations are not oversupplied and have sufficient product variety.

Embodiments navigate a dialogue flow using a trained intelligence bot. In some embodiments, a chat session can be initiated between a user and a trained AI component, such as a trained intelligence bot. For example, the user may be interfacing with a software application, such as an enterprise software application with a given configuration. The software application configuration can include the data that is displayed by the software application, a cross-section of data that the user is viewing, that is being analyzed, or that is otherwise selected, a user identification or role, and any other suitable configuration information. In some embodiments, such software application configuration information can be known as context.

The user may have an intent when chatting with the trained intelligence bot. For example, when using an enterprise application, the user may want to retrieve certain enterprise data, process or analyze certain data, run a batch software process or some other function, a combination of these, or any other suitable intent. In some embodiments, the intelligence bot can be trained to resolve an intent from among a plurality of intents based on the text input by the user, or the user utterances. For example, the intelligence bot can be trained with example text for each of the plurality of intents, and can thus leverage the examples to resolve an intent from the user utterances. The software application context, which can be passed to the intelligence bot, can also be used to resolve the intent.

In some embodiments, a predefined dialogue flow that is associated with the resolved intent can be navigated by the intelligence bot. For example, a dialogue flow associated with the intent can be defined, such as in a markup language data document (or other data description language document). In some embodiments, the data document can define variables, states, and transitions for the dialogue flow. The intelligence bot can exchange messages with the user based on the predefined dialogue flow. In some embodiments, the state transitions followed by the intelligence bot to navigate the dialogue flow are based on the responses the user provides to the intelligence bot's messages.

In some embodiments, the navigation of the dialogue flow can trigger the performance of a function. For example, a retrieval request can be generated to obtain enterprise data, where the parameters for the retrieval request are based on the responses provided by the user while navigating the dialogue flow and/or the software application context. In another example, a software process (e.g., batch process) can be triggered, such as a process that is adjusted based on user intervention/edits or that includes user approval, where the dialogue flow can involve the user intervention, edits, and/or approval that relate to the software process. In some embodiments, one or more of these functions can be included within the navigation of the dialogue flow.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for navigating a dialogue flow using a trained intelligence bot, the method comprising:
   receiving, upon initiation of a chat session between a user and a trained intelligence bot, one or more utterances from the user, wherein
      the chat session is initiated while the user interacts with an enterprise application,
      the enterprise application is configured to retrieve and display one or more cross-sections of a hierarchical multidimensional enterprise data model that comprises multiple data dimensions, the data dimensions comprising data members organized in hierarchies, and
      the intelligence bot is provided enterprise application context data about a state of the enterprise application, at least a portion of the enterprise application context data comprising a cross-section of the hierarchical multi-dimensional enterprise data model selected for display at the enterprise application;
   processing the utterances using the trained intelligence bot to resolve an intent from among a plurality of predefined intents, wherein the intelligence bot is trained to resolve predefined intents from user utterances based on training data associated with each of the predefined intents;
   navigating a dialogue flow associated with the resolved intent using the intelligence bot, such that the intelligence bot guides the user through the dialogue flow using context variables, wherein at least one context variable is defined based on the enterprise application context data provided to the intelligence bot;
   providing, to the user, enterprise data retrieved by the intelligence bot using a retrieval request generated based on the navigation of the dialogue flow and the context variables, wherein the retrieval request comprises parameters that select a cross-section that spans across multiple dimensions of the hierarchical multi-dimensional enterprise data model, the parameters being specified through the dialogue flow that the intelligence bot guides the user through using the context variables; and
   triggering a batch process in response to user input while navigating the dialogue flow that the intelligence bot guides the user through,
   wherein the batch process performs a series of calculations using data from the hierarchical multidimensional enterprise data model and the batch process uses one or more data values from the hierarchical multi-dimensional enterprise data model that are revised by the user while navigating the dialogue flow.

2. The method of claim 1, wherein the training data associated with the resolved intent comprises a plurality of examples of user utterances that indicate the resolved intent.

3. The method of claim 1, wherein the dialogue flow comprises a predefined dialogue flow that configures the intelligence bot to obtain the parameters for the retrieval request from the user, and the parameters are based on the resolved intent that is associated with the predefined dialogue flow.

4. The method of claim 3, wherein the dialogue flow is defined by a data definition document that comprises states, transitions, and variables for the dialogue flow.

5. The method of claim 4, wherein navigating the predefined dialogue flow comprises generating preconfigured messages from the intelligence bot that prompt the user to input the parameters for the retrieval request, and wherein the preconfigured messages are generated by the intelligence bot while transitioning among the states within the data definition document that defines the dialogue flow.

6. The method of claim 5, wherein transitioning from at least a first state of the plurality of states to a second state of the plurality of states is based on input from the user in response to a first preconfigured message generated by the intelligence bot at the first state.

7. The method of claim 6, wherein the data definition document defines a transition from the first state to the second state when input from the user in response to the first preconfigured message is of a first category, and from the first state to a third state when input from the user in response to the first preconfigured message is of a second category.

8. The method of claim 1, wherein the batch process is contingent upon user approval received while navigating the predefined dialogue flow.

9. The method of claim 1, wherein the triggered batch process is configured using the context variable that is based on the enterprise application context data provided to the intelligence bot.

10. The method of claim 1, wherein the enterprise application context data about the state of the enterprise application is provided to the intelligence bot by a web server.

11. The method of claim 1, wherein multiple parameters are received from the user through the dialogue flow that the intelligence bot guides the user through, the multiple parameters defining data members from different data dimensions of the hierarchical multi-dimensional data model.

12. The method of claim 1, wherein the intelligence bot resolves one or more of the parameters using a query retrieved from the user and data retrieved from the hierarchical multi-dimensional data model in response to the query, the resolved parameters comprising one or more data members of one or more data dimensions from the hierarchical multi-dimensional data model.

13. The method of claim 1, wherein the series of calculations performed by the triggered batch process comprise different versions of enterprise metric calculations using different combinations of retail sales parameters, the different versions of enterprise metric calculations being calculated based on the one or more data values revised by the user.

14. The method of claim 1, wherein the batch process is triggered after the user is provided the enterprise data retrieved by the intelligence bot using the retrieval request generated based on the navigation of the dialogue flow, and the one or more data values are revised by the user based on the enterprise data retrieved by the intelligence bot using the retrieval request.

15. A system for navigating a dialogue flow using a trained intelligence bot, the system comprising:
 a processor; and
 a memory storing instructions for execution by the processor, the instructions configuring the processor to:
  receive, upon initiation of a chat session between a user and a trained intelligence bot, one or more utterances from the user, wherein
   the chat session is initiated while the user interacts with an enterprise application,
   the enterprise application is configured to retrieve and display one or more cross-sections of a hierarchical multidimensional enterprise data model that comprises multiple data dimensions, the data dimensions comprising data members organized in a hierarchies, and
   the intelligence bot is provided enterprise application context data about a state of the enterprise application, at least a portion of the enterprise application context data comprising a cross-section of the hierarchical multi-dimensional enterprise data model selected for display at the enterprise application;
  process the utterances using the trained intelligence bot to resolve an intent from among a plurality of predefined intents, wherein the intelligence bot is trained to resolve predefined intents from user utterances based on training data associated with the predefined intents;
  navigate a dialogue flow associated with the resolved intent using the intelligence bot, such that the intelligence bot guides the user through the dialogue flow using context variables, wherein at least one context variable is defined based on the enterprise application context data provided to the intelligence bot;
  provide, to the user, enterprise data retrieved by the intelligence bot using a retrieval request generated based on the navigation of the dialogue flow and the context variables, wherein the retrieval request comprises parameters that select a cross-section that spans across multiple dimensions of the hierarchical multi-dimensional enterprise data model, the parameters being specified through the dialogue flow that the intelligence bot guides the user through using the context variables; and
 triggering a batch process in response to user input while navigating the dialogue flow that the intelligence bot guides the user through, wherein the batch process performs a series of calculations using data from the hierarchical multi-dimensional enterprise data model and the batch process uses one or more data values from the hierarchical multi-dimensional enterprise data model that are revised by the user while navigating the dialogue flow.

16. The system of claim 15, wherein the dialogue flow comprises a predefined dialogue flow that configures the intelligence bot to obtain the parameters for the retrieval request from the user, and the parameters are based on the resolved intent that is associated with the predefined dialogue flow.

17. The system of claim 16, wherein the dialogue flow is defined by a data definition document that comprises states, transitions, and variables for the dialogue flow.

18. The system of claim 17, wherein navigating the predefined dialogue flow comprises generating preconfigured messages from the intelligence bot that prompt the user to input the parameters for the retrieval request, and wherein the preconfigured messages are generated by the intelligence bot while transitioning among the states within the data definition document that defines the dialogue flow.

19. A non-transitory computer readable medium having instructions stored thereon that, when executed by a processor, cause the processor to navigate a dialogue flow using a trained intelligence bot, wherein, when executed, the instructions cause the processor to:
 receive, upon initiation of a chat session between a user and a trained intelligence bot, one or more utterances from the user, wherein
  the chat session is initiated while the user interacts with an enterprise application,
  the enterprise application is configured to retrieve and display one or more cross-sections of a hierarchical multidimensional enterprise data model that comprises multiple data dimensions, the data dimensions comprising data members organized in hierarchies, and the intelligence bot is provided enterprise application context data about a state of the enterprise application, at least a portion of the enterprise application context data comprising a cross-section of the hierarchical multi-dimensional enterprise data model selected for display at the enterprise application;

process the utterances using the trained intelligence bot to resolve an intent from among a plurality of predefined intents, wherein the intelligence bot is trained to resolve predefined intents from user utterances based on training data associated with the predefined intents;

navigate a dialogue flow associated with the resolved intent using the intelligence bot, such that the intelligence bot guides the user through the dialogue flow using context variables, wherein at least one context variable is defined based on the enterprise application context data provided to the intelligence bot; and provide, to the user, enterprise data retrieved by the intelligence bot using a retrieval request generated based on the navigation of the dialogue flow and the context variables, wherein the retrieval request comprises parameters that select a cross-section that spans across multiple dimensions of the hierarchical multi-dimensional enterprise data model, the parameters being specified through the dialogue flow that the intelligence bot guides the user through using the context variables; and triggering a batch process in response to user input while navigating the dialogue flow that the intelligence bot guides the user through, wherein the batch process performs a series of calculations using data from the hierarchical multi-dimensional enterprise data model and the batch process uses one or more data values from the hierarchical multi-dimensional enterprise data model that are revised by the user while navigating the dialogue flow.

* * * * *